Figure 1:
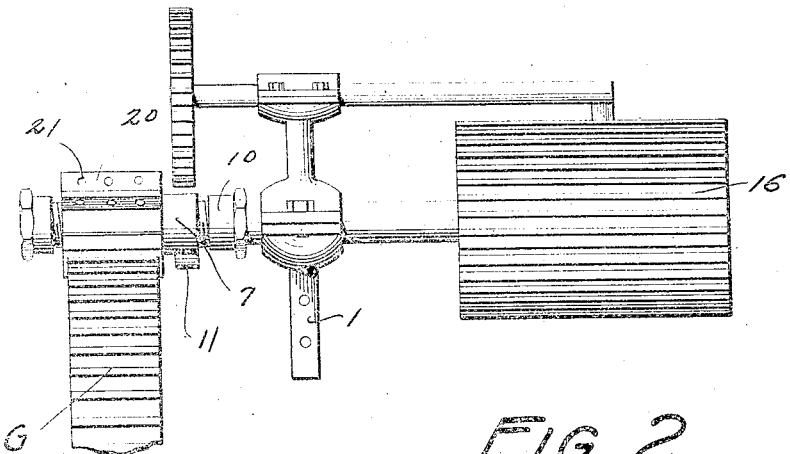

D. E. PAPPENFUS.
GEAR GREASER.
APPLICATION FILED MAR. 29, 1918.

1,287,410.

Patented Dec. 10, 1918.
2 SHEETS—SHEET 1.

INVENTOR
Daniel E. Pappenfus

WITNESSES

BY

ATTORNEY

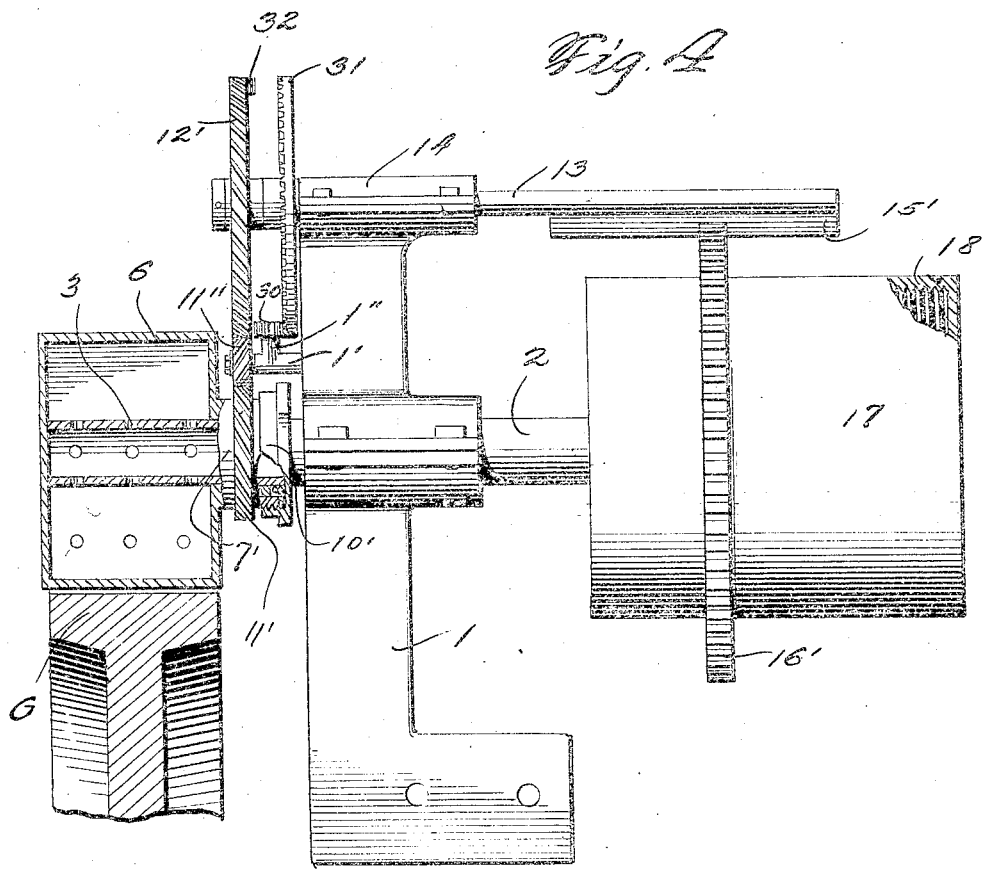

UNITED STATES PATENT OFFICE.

DANIEL E. PAPPENFUS, OF DOOLEY, MONTANA.

GEAR-GREASER.

1,287,410.

Specification of Letters Patent.  Patented Dec. 10, 1918.

Application filed March 29, 1918.  Serial No. 225,557.

*To all whom it may concern:*

Be it known that I, DANIEL E. PAPPENFUS, a citizen of the United States, residing at Dooley, in the county of Sheridan and State of Montana, have invented certain new and useful Improvements in Gear-Greasers, of which the following is a specification.

This invention relates to lubrication, and more especially to force feed devices which are mechanically operated; and the object of the same is to provide means for applying a fixed lubricant such as grease to the teeth of a very large gear such as sometimes constitutes the fly wheel in motor plants. A further object is to provide means for driving this greaser from the rotation of the gear itself, so that its lubricating action will cease when the gear stops rotating, and so that the amount of lubricant fed to the teeth of the gear will be dependent on the rotation and speed of rotation of the latter.

These several objects are carried out by constructing the device in a manner hereinafter more fully described and claimed and as shown in the drawings, wherein:—

Figure 1 is a side elevation of the greaser complete, and

Figure 2:
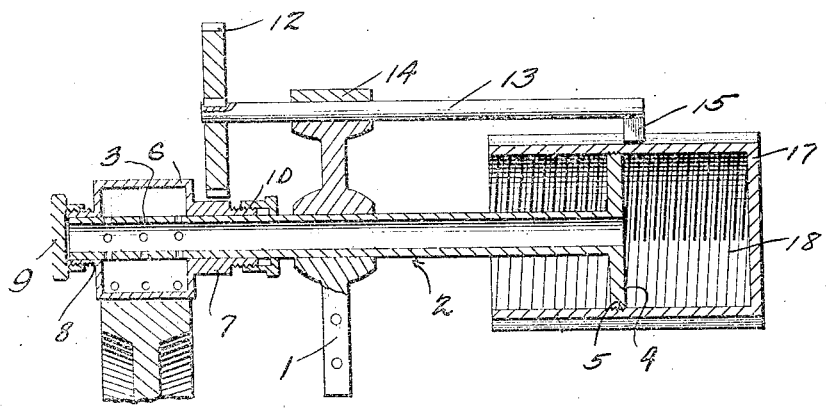
Figure 3:
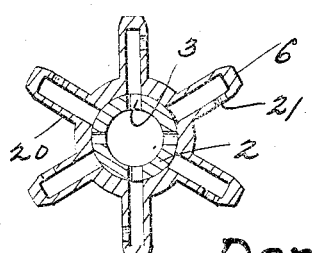

Fig. 2 a vertical section through the same and a portion of the gear being lubricated, Fig. 3 is an enlarged transverse section of the hollow pinion referred to below.

Fig. 4 is a side elevation partly broken away, showing a modified and in some cases a preferred form of this invention.

Mounted in a suitable bracket 1 is a horizontal pipe 2 having perforations 3 near one extremity and a piston head 4 fixed on its other extremity and threaded around its periphery as at 5. A hollow pinion 6 has its hubs 7 and 8 rotatably mounted on the pipe 2, and the last named hub may well be threaded as shown at the left in Fig. 2 and closed by a cap nut 9 which also closes this end of the pipe. The other hub 7 may have a packing gland 10 as shown, but essentially it is provided with a single tooth 11. At each revolution of this hub, the said tooth engages one of the teeth of a gear 12 whose shaft 13 is journaled as at 14 in the bracket 1 and has at its remote end a single tooth 15 engaging the long teeth 16 on a drum 17 which is to contain the lubricant. This drum is internally threaded as shown at 18 to engage the threads 5 and the periphery of the piston head 4, and it follows that the rotation of the shaft 13 will intermittently cause the rotation of the drum and its advance toward the left in Fig. 2, whereby lubricant or grease at the right of the piston head will be forced through the tube or pipe 2.

The pinion 6 is preferably of about the construction best seen in Fig. 3. Each of its teeth 20 is hollow and rather long on a line parallel with its hubs and its axis, and in one or both walls of each tooth are perforations 21 through which the lubricant exudes. This pinion rotates around the pipe 2 where the latter is perforated at 3 and the perforations come successively into register with the inner ends of the openings in the several teeth. When now grease or other lubricant is forced along the pipe by the means already described, it oozes out the perforations 3 and is picked up by the hollow teeth 20 as they pass said perforations. Eventually these teeth become filled with grease and the same is ejected through the perforations 21. The large gear designated by the letter G has its teeth in mesh with those of the pinion 6 as indicated in Fig. 1, and such pinion is rotated quite rapidly by the revolution of the gear. This rapid rotation is reduced by the means described, although I would not wish to be limited to this exact means, so that eventually the drum 17 is rotated in steps and very slowly. As has been explained the rotation ejects the grease therein along the pipe 2, and into the pinion 6, and the latter applies it to the teeth of the large gear G automatically. When the rotation of this gear ceases, the action of the greaser ceases, and when the rotation of the gear G is sped, the action of the greaser increases automatically. The device needs no attention excepting that on rare occasions the drum must be filled with grease to the right of the piston head 4, and said head reset near the left end of the drum so that it may repeat the action described above.

Such is the construction of that form of my invention shown in Sheet 1 of the drawings. On Sheet 2 is shown another and much similar construction. The bracket 1 carries the pipe 2 perforated at 3 within the hollow pinion 6 which meshes with the large gear G, and journaled at 14 in said bracket is a shaft 13 having in the present instance a long tooth 15' meshing with the teeth in a ring 16' on the periphery of the drum 17, the latter being internally threaded at 18 to engage the threads on the edge of the piston 4 as best seen in Fig. 2. The hub 7' of the pinion 6 is held on the pipe 2 by a gland 10', and this hub carries a gear 11' meshing through an idler 11'' with a gear 12' loose on the shaft 13. Said idler is mounted on a pin 1' projecting from the bracket 1 and carrying an upstanding stud 1'' as seen. On this stud is mounted a pinion 30 meshing with a rim gear 31 fast on the shaft 13, and the large gear 12' carries a single tooth 32 which at each revolution of said gear turns the pinion 30 the distance of one tooth thereon. This turns the rim gear the distance of one tooth on its periphery, and at one complete revolution of the shaft 13 the long tooth 15' turns the toothed ring 16' one tooth. Thus it will be seen that the relation between the large gear G and the rotation of the drum 17 is varied considerably by this arrangement and the gear could make a great many revolutions without the drum being moved forward more than a fraction of an inch. This, however, is what is desired, because the forward feeding of the drum causes the lubricant to exude through the pipe 2 and the perforations 3 thereof, and be delivered onto the teeth of the large gear in a manner already set forth.

The foregoing description and the drawings have reference to what may be considered the preferred, or approved forms of my invention. It is to be understood that I may make such changes in construction and arrangement and combination of parts, materials, dimensions, et cetera, as may prove expedient and fall within the scope of the appended claims.

What is claimed as new is:—

1. In a gear lubricator, the combination with a pinion having hollow teeth meshing with the teeth of said gear, and a tubular shaft having its body perforated near one end to deliver into the interior of said pinion; of a cylindrical container for grease telescopically mounted to inclose the other end of said shaft, and means for advancing the container automatically by the rotation of said pinion.

2. In a gear lubricator, the combination with a pinion having hollow teeth meshing with the teeth of said gear, a fixed tubular shaft having its body perforated near one end and closed at its extremity to deliver into the interior of said pinion, and a piston head fixed on the other end of said shaft; of a cylindrical container for grease movably mounted to inclose said piston head, and means for advancing the container automatically by the rotation of said pinion.

3. In a gear lubricator, the combination with a pinion having hollow teeth meshing with the teeth of said gear, a fixed tubular shaft having its body perforated near one end and closed at its extremity to deliver into the interior of said pinion, and a piston head fixed on the other end of said shaft; of a cylindrical container for grease movably mounted on said piston head, the edge of the head and the interior of the container having interengaging threads, and means for turning the container step by step by the rotation of said pinion.

4. In a gear lubricator, the combination with a pinion having hollow teeth meshing with the teeth of said gear, a fixed tubular shaft having its body perforated near one end and closed at its extremity to deliver into the interior of said pinion, and a piston head fixed on the other end of said shaft; of a cylindrical drum for grease movably mounted on said piston head, the edge of the head and the interior of the container having interengaging threads, long teeth on the exterior of said drum, and reducing gearing between said pinion and teeth whereby the drum is rotated intermittently by the rotation of said pinion.

5. In a gear greaser, the combination with a hollow pinion whose teeth engage the gear, a fixed tubular shaft delivering at one end to the interior of said pinion, and a piston head fixed on the other end of said shaft and threaded around its edge; of a grease-containing drum internally threaded to engage said piston head and having long teeth on its periphery, a shaft having a single tooth at one extremity engaging said long teeth at each rotation of the shaft, a gear on the other extremity of the shaft, and a single tooth on one hub of said pinion engaging said gear at each rotation of the pinion.

In testimony whereof I affix my signature in presence of two witnesses.

DANIEL E. PAPPENFUS.

Witnesses:
H. C. HANSON,
A. E. HURST.